Jan. 3, 1928. 1,654,710
O. M. TUCKER ET AL
TIMING MECHANISM FOR GLASS FEEDING APPARATUS
Filed Nov. 15, 1924 6 Sheets-Sheet 2
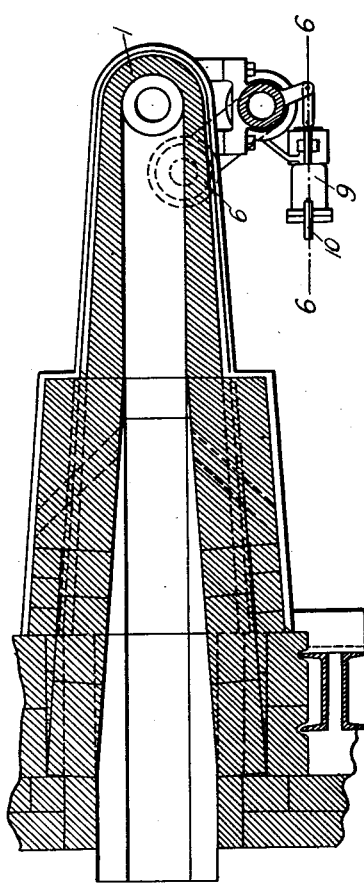
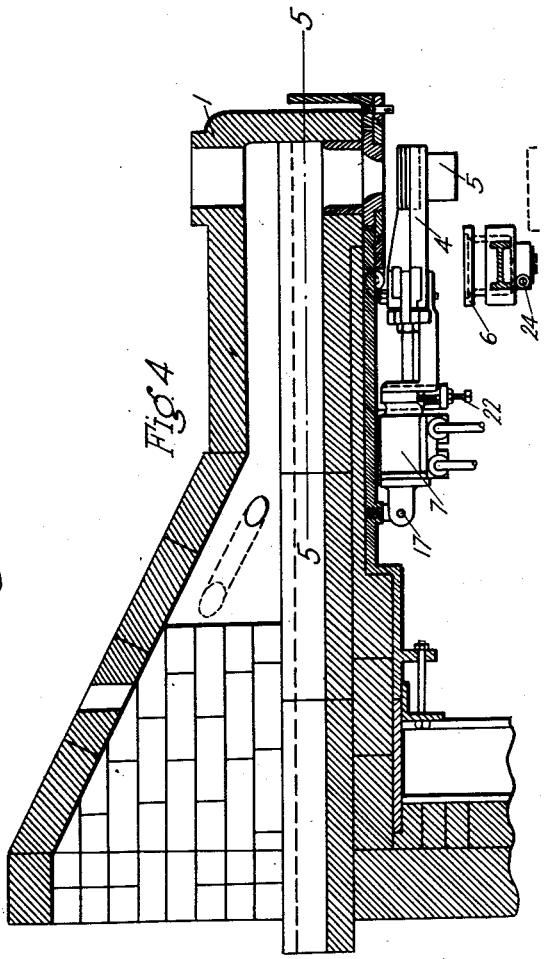
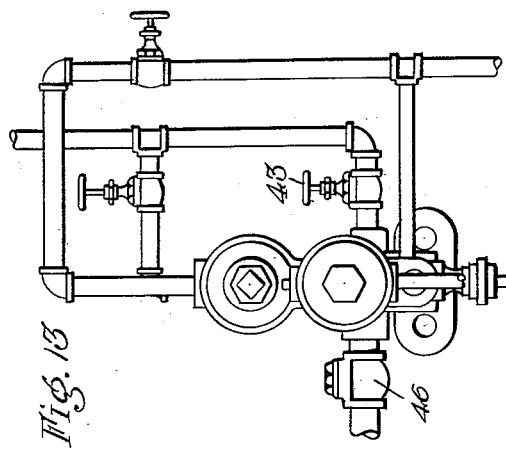
Oliver M. Tucker
William A. Reeves INVENTORS
BY
ATTORNEYS.

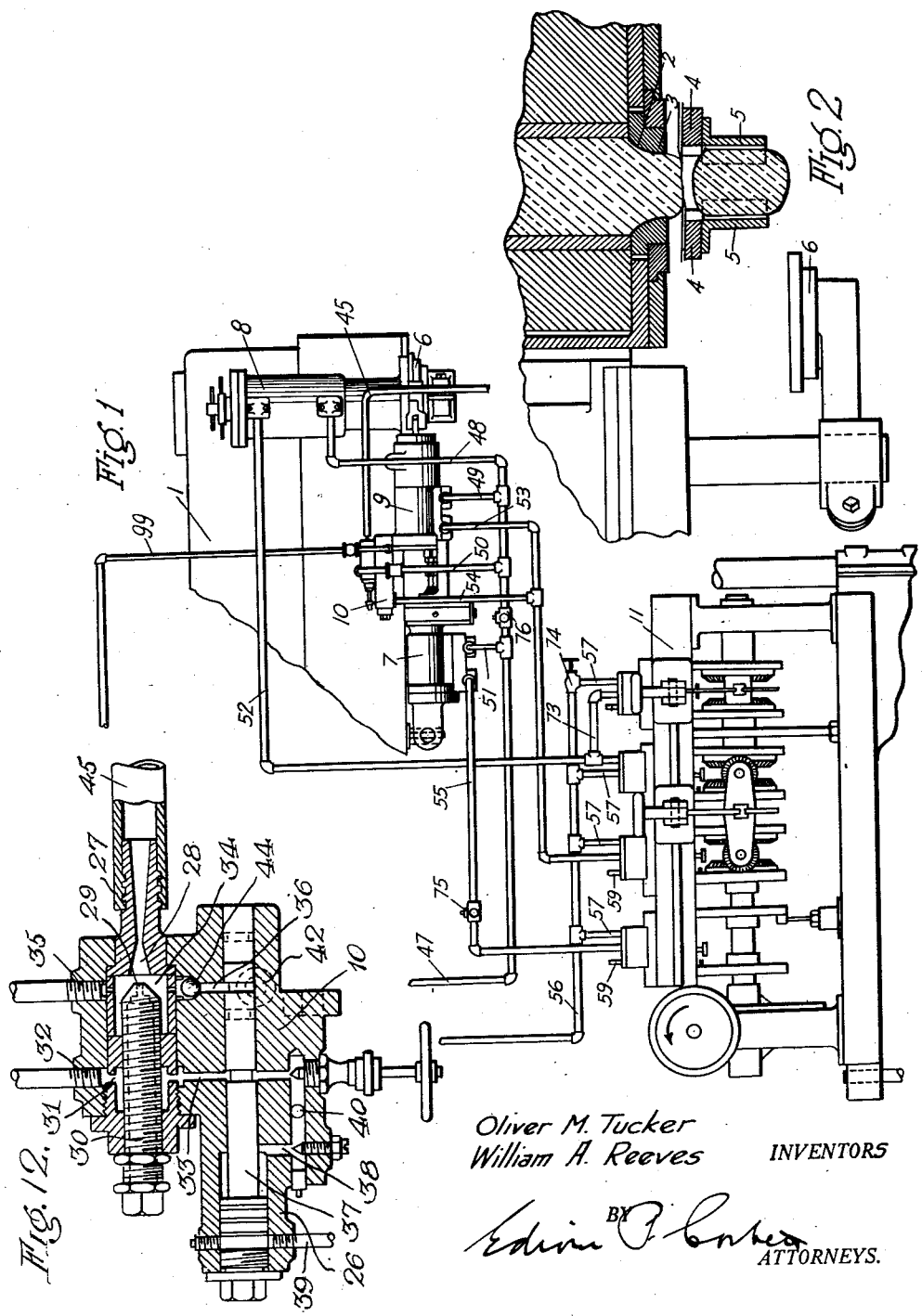

Jan. 3, 1928. 1,654,710
O. M. TUCKER ET AL
TIMING MECHANISM FOR GLASS FEEDING APPARATUS
Filed Nov. 15, 1924   6 Sheets-Sheet 3

Oliver M. Tucker
William A. Reeves   INVENTORS

BY
ATTORNEYS.

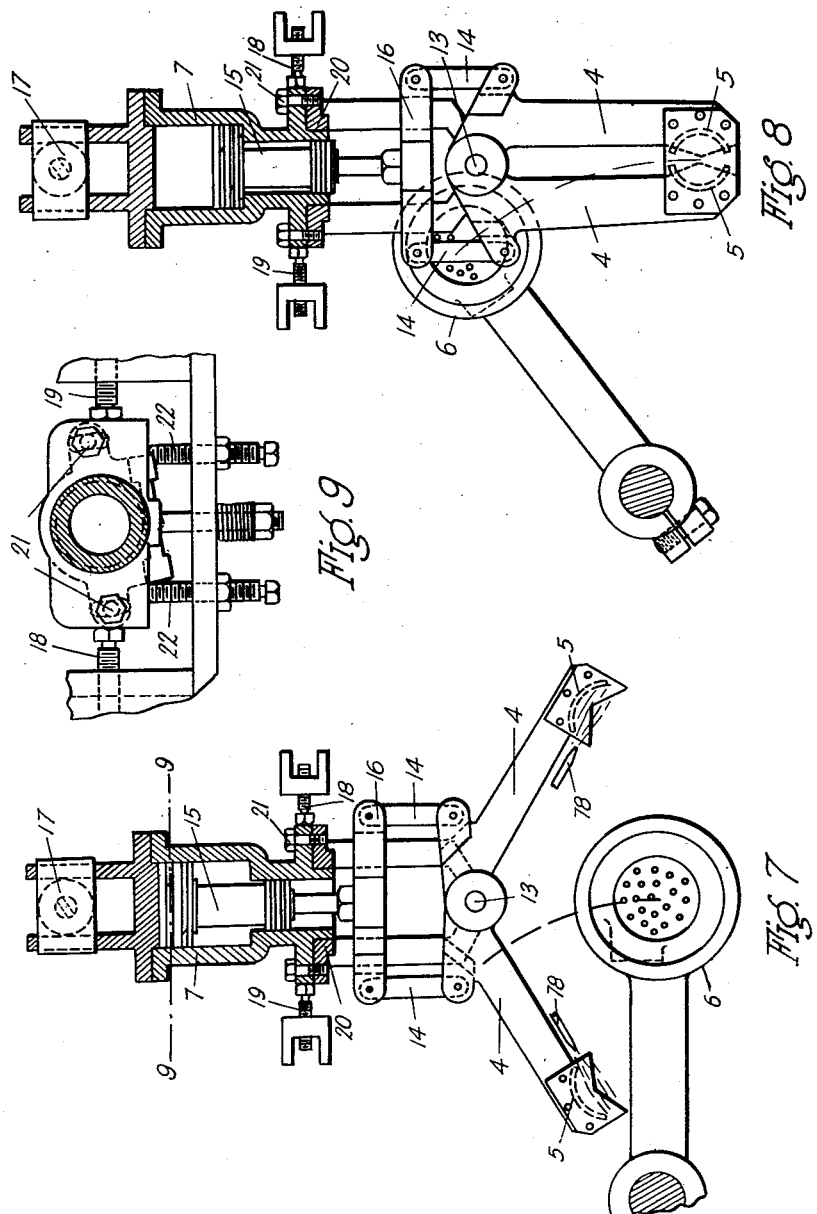

Jan. 3, 1928.　　　　　　　　　　　　　　　　　1,654,710
O. M. TUCKER ET AL
TIMING MECHANISM FOR GLASS FEEDING APPARATUS
Filed Nov. 15, 1924　　　6 Sheets-Sheet 5

Oliver M. Tucker
William A. Reeves INVENTOR.

BY
　　　ATTORNEYS.

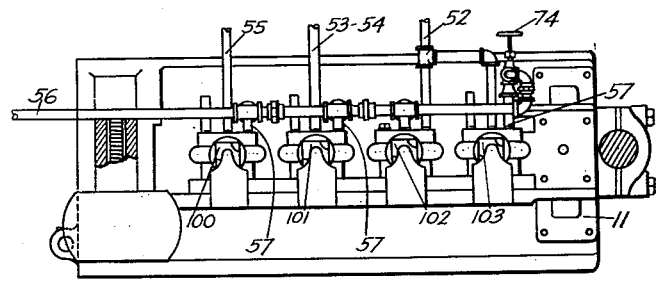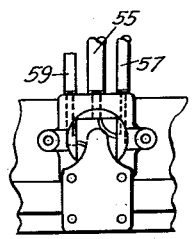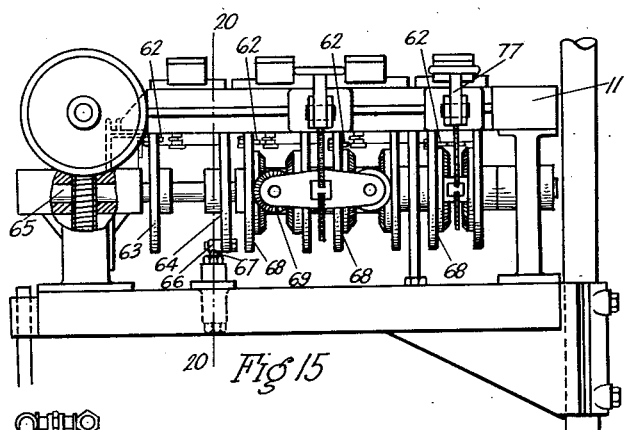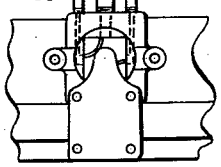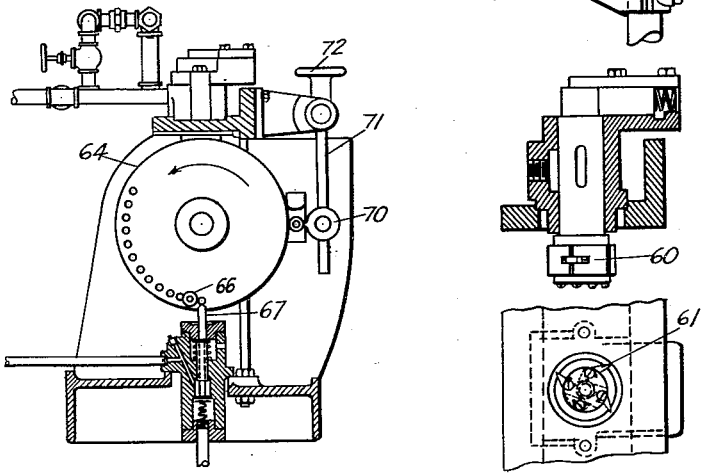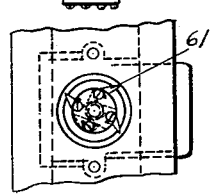

Patented Jan. 3, 1928.

1,654,710

UNITED STATES PATENT OFFICE.

OLIVER M. TUCKER AND WILLIAM A. REEVES, OF COLUMBUS, OHIO, ASSIGNORS, BY MESNE ASSIGNMENTS, TO HARTFORD-EMPIRE COMPANY, OF HARTFORD, CONNECTICUT, A CORPORATION OF DELAWARE.

TIMING MECHANISM FOR GLASS-FEEDING APPARATUS.

Original application filed September 16, 1916, Serial No. 120,429. Divided and this application filed November 15, 1924. Serial No. 750,065.

Our invention relates to timing mechanism for glass feeding apparatus and has to do particularly with timing mechanism for automatically operating glass-feeding apparatus which is regulable to take care of practically all conditions which occur or are likely to occur in the feeding of molten glass. Still further, our invention relates particularly to glass-feeding apparatus for separating batches of glass from a molten mass and delivering such batches of glass for treatment in compact form free from laps, folds or blisters wherein the various operating parts are operable by air under pressure and wherein the provision of automatic means is contemplated for regulating the application of such air under pressure to cylinder and piston elements which control and operate the various elements of the feeding device.

There are three methods generally used today in the separation of quantities of molten glass from mass for the making of glass articles. These are the gathering of glass by hand on the end of a punty, the gathering of glass by suction, and the gathering of glass by flowing it into a mold or other receptacle wherein it is to be finally treated. The first method has hitherto produced the best grade of finished article. The second method leaves a defect and weakness in the finished article. The third method is being rather widely used, although it is particularly defective in that the very flowing of the glass into a mold or other receptacle inevitably involves a coiling or lapping action of the glass stream wherein the exterior chilled skin of the superimposed coils never merges completely enough to avoid subsequent marks and blisters in the article made from the gathered quantity.

Our invention is a radical departure from any of these methods. It does not flow glass into a mold or other receptacle. Therefore, there is no coiling in the receptacle. It is more closely related to the gathering of glass by hand in that it separates and delivers a compact lump or gob of glass. It is even superior to the hand method because the gob delivered is mechanically measured, is gathered by an extruding action rather than by the spinning action of a punty, and is free from "tails" such as are formed on the hand-made gather at the time of severance from the punty, being at the same time more uniform in size, shape and weight.

The form of apparatus, as shown by the annexed drawings, which we use to illustrate our invention employs differential area pistons for actuating the several movable units or elements of our feeder. However, it is obvious that our invention is not limited to such a construction but its principles may be embodied in a great number of varying forms. In accordance with the drawings, in the structure illustrated, constant air pressure is applied to one area of each piston to maintain the particular element in a given position while air pressure is intermittently applied to a larger area of each piston so as to overcome the constant pressure air and cause the piston to move, that is, constant and intermittent pressures cause actuation of the different units at the proper time. One object of this invention is to provide means for effecting the actuation of the different units at the proper time relative to each other and to the press or other glass-forming machine in order that the proper size, weight and shape, lump or gob of glass will be properly delivered to the press or other forming machine without lapping, coiling or folding in the receptacle in which it is received. These proper times are determined and controlled by a timing mechanism by passing the intermittently applied air first through the timing mechanism, from which it is delivered at selected intervals to the various units or elements of the glass feeder and to the mechanism for starting the forming machine in motion.

This application is a division of our pending application, Serial No. 120,429, filed September 16, 1916, apparatus for separating quantities of molten glass from mass.

Other and further objects and features of our invention will be apparent as this description progresses and by reference to the accompanying drawings wherein,—

Figure 1 is an assembly view of our apparatus.

Figure 2 is a detail looking from the right of Figure 1 and partially broken away, showing the discharge aperture and the cutting knives.

Figure 3 is a horizontal longitudinal section of the spout shown in Figure 1 with the top removed.

Figure 4 is a vertical longitudinal section illustrating the structure in Figure 3.

Figure 7 is a detail in plan of the knife and cup structure, showing the knives separated and the cup in operative position therebetween.

Figure 8 is a detail in plan of the structure shown in Figure 7, but showing the knives in operative position and the cup in inoperative position.

Figure 9 is a section taken on line 9—9 of Figure 7 and looking towards the right.

Figure 12 is a vertical longitudinal section of a special type of injector very important in the practice of our invention.

Figure 13 is a rear elevation of this injector.

Figure 14 is a plan view of the mechanism for controlling the operation of the various parts of our apparatus through the medium of air pressure, valves and automatically effective and adjustable mechanism being shown.

Figure 15 is a side elevation of the structure shown in Figure 14.

Figure 16 is a vertical section of one of the valves illustrated in Figures 14 and 15.

Figure 17 is an enlarged detail in plan of one of these valves, showing it in position to receive and deliver compressed air to its cylinder.

Figure 18 is a view similar to Figure 17, only showing the valve in position to exhaust air from its cylinder to the atmosphere.

Figure 19 is a bottom plan view of the structure shown in Figure 16 showing the peculiar type of star wheels which are operated to rotate the valves by a step-by-step action by means of the mechanism illustrated in Figures 14 and 15.

Figure 20 is a section taken on line 20—20 of Figure 15 showing the special adjustable mechanism for tripping a valve to synchronize the starting of the press or other forming machine with the various operations of our apparatus.

Figure 5:
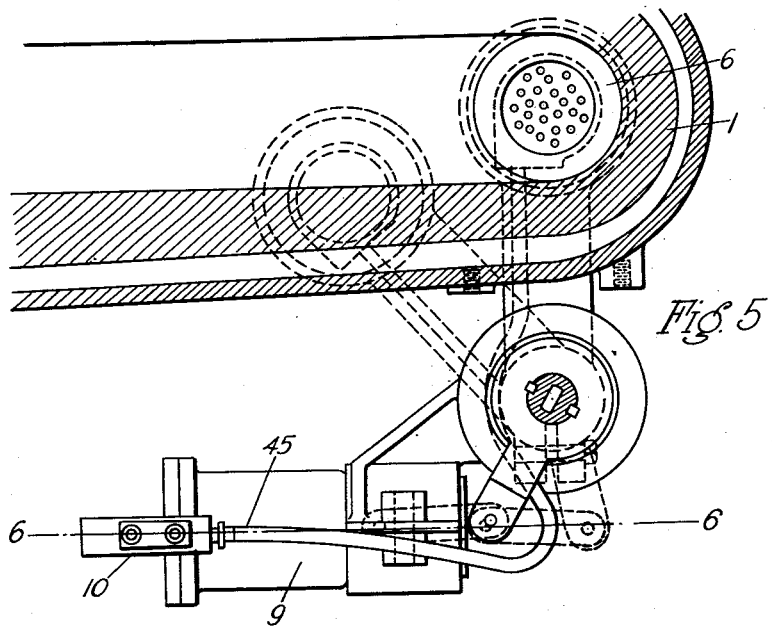
Figure 5 is a horizontal longitudinal section taken on line 5—5 of Figure 4 illustrating the operative and inoperative positions of our combustion cup.

With particular reference to Figures 1 and 2 of the drawings, our glass feeding apparatus may comprise a spout 1 connected to a tank (not shown) and having an aperture 2 in a bushing 3.

The bushing 3 is of a peculiar type having important advantages and is also mounted in a novel manner. In the first place, it is made in two parts, and the upper part is permanently positioned while the lower part is secured upon a hinged ring (see Figure 4) and is removable therefrom so that similar parts of varying size may be applied. Thus there is provided an enlarged chamber immediately above the delivery orifice of the bushing and yet the walls of this delivery orifice are tapered. The result is that a comparatively large volume of molten glass is fed to the point where this delivery orifice commences and then the central portion of this volume is discharged through this comparatively short and tapered orifice. The result is that friction against the walls of the bushing is practically eliminated, for the glass which is actually delivered is taken from the center of a stream of larger diameter and extruded through an orifice of minimum depth. The formation of the bushing in two parts and the mounting of this bushing on a hinged ring also facilitates changing of the bushing, since the hinged ring may be swung down and a new bushing placed thereon with little difficulty and at a point comparatively remote from the hot glass.

Working immediately below the spout and preferably carried thereby is a pair of knife arms 4 carrying deflectors 5. These knives are designed to be successively brought together and separated and they have various adjustments, to be described. They are mounted to have a practically instantaneous cut and this is particularly important when the diameter of the extruding glass is considered. Mounted and controlled for operation while the knives are inoperative is a combustion cup 6 which is automatically effective for a predetermined period of time after each cutting action, this period of time being variable at will by the adjustment of timing mechanism to be described. The knives are controlled by a piston and cylinder mechanism designated 7. The combustion cup is given vertical movement by the vertical piston and cylinder construction 8 and is given horizontal movement by the horizontal piston and cylinder construction 9. The combustion cup is fed with a combustible mixture by an injector 10 and the effect of the compressed air used for the different cylinders and for the injector is controlled by a timing mechanism 11.

The knife structure is illustrated best in Figures 2, 7, 8 and 9 and comprises blades carried upon arms 4 which are pivoted at 13 and which are provided with perforated ears to which are attached operating links 14 connected by a cross piece 16 mounted upon a piston stem. This piston stem carries piston 15 operable by air. The manner of bringing together and separating these knives by the use of air pressure will be made apparent by a general description of the type of cylinder and piston used throughout this apparatus.

An examination of Figures 7 and 8 will show that the knife is swiveled as at 17 while its opposite end may be swung horizontally under the restraint of set screws 18 and 19. This adjustment is important for several reasons. One reason is that it is desirable that the severed portion fall and alight upon its base as well as in a centered position upon its treating surface. A slight adjustment of these knives sidewise will tend to ensure this result if the fall has hitherto been defective. This adjustment has an increased effectiveness because of the deflectors 5.

In the section taken on line 9—9 (Fig. 7), it appears that the support 20 for the knives per se has bolt and slot connection at 21 whereby the knives may be bodily tilted from the horizontal. This is a very desirable construction. The cutting blades are necessary in different horizontal planes. The result is that there is a tendency to bat the glass sidewise and that the severance of the glass produces an uneven cut upon the bath which is then deposited but particularly upon the lower end of that portion of the glass which is still connected to the mass. The disposition of these knives in tilted position has several results. In the first place, it neutralizes this tendency of the knives to bat the glass sidewise. In the second place, it reduces the irregularity of the cut surface of the glass still appended to the mass.

A vertical adjustment of the free end of this knife structure about its swivel may be effected by one or more set screws 22. There are many important advantages to this adjustment chiefly relating to the maintenance of proper form for the extruding glass under different conditions such as varying viscosities et cetera.

Figure 6:
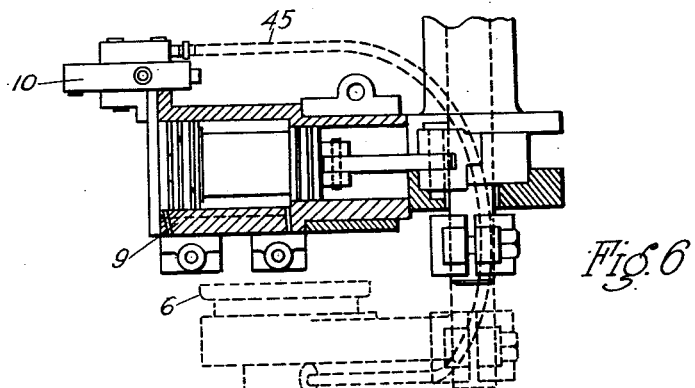
Figure 6 is a section taken on line 6—6 of Figure 3 and Figure 5.
Figure 10:
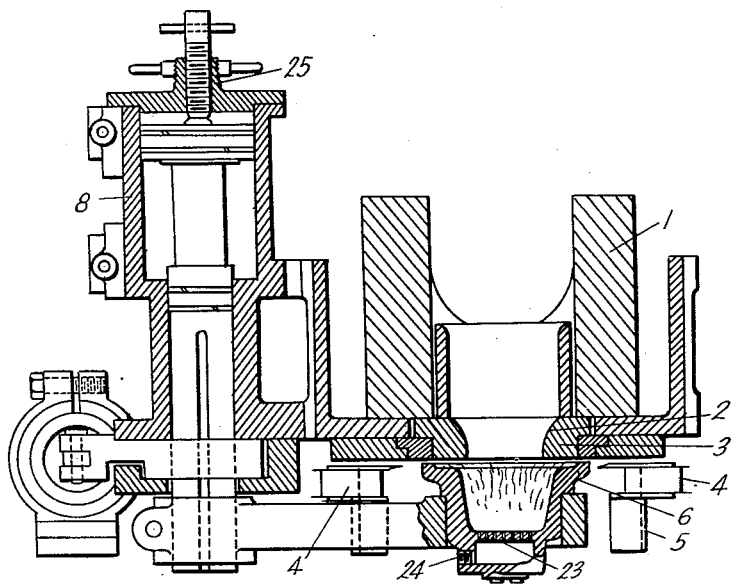
Figure 10 is a detail in vertical section illustrating the knives separated and the combustion cup in operative relation to the spout aperture.
Figure 11:
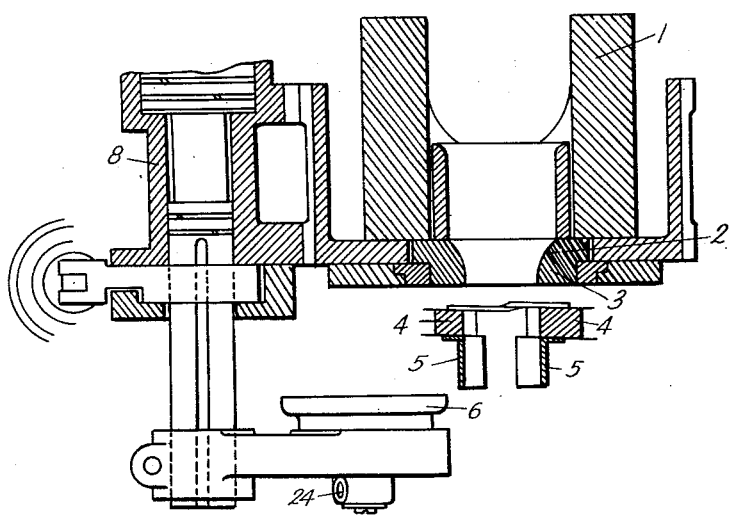
Figure 11 is a detail in vertical section showing the knives in operative position and the cup in inoperative position.

The combustion cup is best illustrated in Figures 5 and 6, 10 and 11 and has been designated 6. It comprises a cup with a perforated false bottom 23 and with an inlet 24 in the chamber beneath the false bottom for the introduction of the combustible mixture thereto. This inlet is preferably tangentially disposed so that the gaseous mixture delivered to the chamber beneath the false bottom has a swirling action in its delivery to the perforations of this false bottom. The cup is desirably controlled by air under pressure and is capable of various movements. After each operation of the cutting knives, this cup swings into position beneath the feed aperture of the spout and then moves upwardly into desired relation to the glass in or depending from the spout.

The combustion cup is connected to a source of supply of a fluid under pressure, preferably a combustible mixture, in such a manner that a certain quantity of the mixture is always being fed thereto. Thus, the cup always contains a flame, although in the periods of inaction this flame is simply in the nature of a pilot light. The controlling apparatus is such that, in synchronism with the movement of the combustion cup into operative position, a great increase in the combustible mixture fed thereto takes place. Furthermore, the mixture fed during the period of action is fed under a maintained pressure. It is very important that this be done and we have accomplished it by the use of a novel and peculiar form of injector, to be described. The position of the combustion cup is regulable by the adjustable stop 25 in the top of the vertical cylinder 8 and the pressure of the mixture within the cup is also regulable. The actions of both the cup and the pressure therein may be varied to attain unusual results. This variability or regulability of the cup and of the pressure therein may be effected independently or together. In other words, the position of the cup may be varied to vary the pressure upon the glass, the pressure of the mixture may be varied to vary the pressure upon the glass, or both the position of the cup and the pressure of the mixture may be varied to attain this result. The variations in the position of the cup must necessarily be within a very slight range if combustion and pressure are to be maintained. Nevertheless, the cup is variable within this range and these variations are extremely important in the effect produced upon the glass.

One method of using the combustion cup is to swing it into such a position and with the mixture at such a pressure that the glass extruding from the feed aperture of the spout is balanced and halted in its movement. Another method is to swing it into such a position and with the mixture at such a pressure that the normal movement of the molten glass in the spout is reversed and this glass driven up into the spout. A third method is to swing the combustion cup into position below the aperture and then cause the cup to recede as the glass advances, with the flame of the cup playing upon this glass. A fourth method is to hold the combustion cup in position until the free end of the extruding glass almost touches the base of the cup and then to gradually lower the cup, retarding the extrusion of the glass and in some measure influencing its form by the impact of the blast. In all of these forms, the glass is being subjected to an extremely intense heat with the result that such marks as were made by the shears are entirely removed and detrimental chilling of the extruding glass is obviated. It is obvious that this combustion cup in operation under the control of its operating and the timing mechanism not only times the movement of the extruding glass so as to properly time its delivery to the approaching mold. It performs a more vital function, since it is this rate of movement of the glass and the time it is in motion that determines the weight of the batch or gob of glass to be delivered, as long as the regularity of action of the cutting knives and the size of the aperture is unchanged. Special attention is directed to this fact that we, by using a feed aperture of sufficient and unvarying size for ware of a given range of weight and size, are enabled to secure a compact batch or gob of glass whose weight is mainly regulated by the rate of extrusion of the glass and the time of extrusion from the withdrawal of the cup to each succeeding cutting action.

Very peculiar results are attained from the different uses of this combustion cup. For instance, when the cup is used with sufficient pressure and the glass is comparatively fluid it is forced up into the spout, with the result that during its return it gathers impetus and extrudes a batch of greater diameter than it would otherwise have and with less tendency to string out in the early stages of extrusion. This is extremely desirable in varying the form of the batch or gob to be severed. On the other hand, there are certain conditions, as when the glass is more viscous, when it is more desirable to simply counterbalance the glass. It is difficult to enumerate all of the possible variations in the use of this combustion cup but experience has demonstrated that it is effective to meet practically all the varying conditions to be met with in the separation automatically of batches of glass from a molten mass.

The injector is shown in Figures 12 and 13 as comprising a casing 26 having a discharge pipe 27 and a Venturi tube 28 contained therein. Disposed directly in front of the inlet of this tube is a jet 29 having ports 30 therein in communication with a chamber 31. This chamber 31 is designed to be fed with air under pressure through a pipe tap 32 when the combustion cup is in stationary inoperative position and through a port 33 from the moment this cup starts to move toward operative position until it returns to its stationary inoperative position. Likewise, the discharge orifice of the jet 29 is disposed in a chamber 34 and this chamber 34 is fed with gas, due to the velocity of the air through the Venturi tube, producing a suction through the pipe tap 35 when the cup is in stationary inoperative position and through the port 36 from the moment the cup starts to move toward operative position until it returns to stationary inoperative position. The ports 33 and 36 are controlled by the piston valve 37, which is movable to open position by the introduction of air through port 38 and is movable to inoperative position by the introduction of air through port 39. The air supply port is indicated at 40 and it will appear that its communication with the port 33 is governed by valve 41. The gas supply port is indicated at 42 and is likewise under the control of a valve 43. The gas port 36 may be provided with a check valve 44 which opens under suction produced by the passage of compressed air from the jet 29 through the Venturi tube but which automatically closes in the event that this air passage through the said tube is choked off.

A feature of vital importance in our improvement has to do with an auxiliary check valve made a part of this injector. It is obvious that the air and gas mixture is forced into the combustion cup from the outlet 27 through a flexible pipe 45 under pressure even when the cup is in stationary position. At or about the instant the cup starts to move towards operative position, the piston valve of the injector is operated by mechanism provided for greatly increasing this pressure. It is obvious, however, that the volume of gas is determined in some measure by the vacuum caused by the air jetted through the Venturi tube. It is likewise obvious that this vacuum will vary in degrees, dependent primarily upon the degree of outlet from the combustion cup. It is necessary to success of the highest kind that a substantially uniform combustion be maintained in the cup regardless of the variations in the outlet from such cup. Variations in the air pressure may not be so vital but the gas drawn in must be substantially uniform in volume. This variation of condition is due primarily to the different positions under which the cup operates and it may be due to other things. Whatever the causes are, however, we have found it extremely important to success that some means be provided to maintain a substantially uniform vacuum so that there will be a substantially uniform volume of gas forced into the combustion cup with the air.

Our apparatus for accomplishing this result has taken the form of a check valve 46 which is definitely weighted and covers an opening of a definite size so that any increase of the vacuum in the chamber 34 above a predetermined degree will raise this check valve and draw in sufficient air to reduce the vacuum. The injector is constructed capable of creating a vacuum higher than is desirable and this auxiliary valve is used to set a limit to the degree of vacuum actually used and consequently to insure a uniform volume of gas being forced into the combustion cup.

The cylinders and pistons used in our invention are of the type illustrated in our application, Serial No. 797,067, filed October 24, 1913. The peculiarity in construction appears in Figures 6, 7, 8, 10 and 11. It arises from the fact that air is admissible to both sides of the piston head and that one side of this piston head is of greater area than the other side. Constant pressure air is maintained against that side of the piston head having the smallest exposed area. This maintains the piston in normal position. Then the pistons are operated by the automatic introduction of air pressure, to the sides of the piston which have the largest area, under control of the timing mechanism to be described.

The piping for conducting the air under pressure to the cylinder and the injector is illustrated best in Figure 1 of the drawings. Referring to Figure 1 of the drawings, the constant pressure air is supplied through main pipe 47. It is directed to the cylinder whose piston moves the combustion cup vertically by branch pipe 48, to the cylinder whose piston moves the combustion cup horizontally by branch pipe 49 to the operating chamber for the injector valve by branch pipe 50, and to the cylinder whose piston operates the cutting knives by branch pipe 51. The positive actuation of the piston for causing the lowering of the combustion cup is effected by the introduction of air through the pipe 52; the positive operation of the piston for swinging the cup horizontally into operative position is effected by the introduction of air through the pipe 53; the movement of the valve of the injector into operative position is effected by the introduction of air through the pipe 54; and the knives are brought together by introducing air through the pipe 55. The gas supply pipe is indicated at 99.

The timing mechanism for controlling the valves which admit air to the pipes 52, 53, 54 and 55 is illustrated in Figures 1 and 14 to 19. In these figures it will be noted that the air is fed from left to right through the piping 56 and thence through branch pipes 57 by rotary valves. Each rotary valve has two arcuate ports so that its movement in successive quarter-turns successively connects a branch 57 with a pipe that delivers to a cylinder and then with an exhaust 59. (See Figures 17 and 18 for successive position of a valve.)

These rotary valves carry upon their bases star wheels 60 with points 61 yieldable one way, whereby such valves may be given quarter-turns successively by pins which may be collectively designated 62 carried upon a series of disks. The operations of these disks vary to some extent as follows:

The knife operating disk may be designated 63. It is rigidly mounted upon the driven shaft 65 and carries a couple of pins 62. The first pin which is presented to operate the star wheel by rotation is preferably immovably mounted. The second pin is desirably capable of adjustment by positioning in any one of a series of apertures arranged adjacent the periphery of the disk in a manner similar to that shown in Figure 20. The operation of these pins upon the star wheel of the valve is very rapid. The first pin gives the star wheel and its valve a quarter-turn and thus brings it into position to admit operating air to the cylinder 7, which results in bringing the knife arms together to sever the glass. Immediately, the other pin gives the star wheel and its valve another quarter-turn and brings it into position to exhaust air from the cylinder 7, with the result that the knife arms are separated. The complete action of the knife arms is practically instantaneous and this is extremely desirable in view of the volumes of glass being severed and the intense heat which is otherwise liable to injure the knife blades.

The disk 64 is shown in detail in Figure 20 and is a rigidly mounted disk utilized to trip the valve which sets in motion the press to be disposed beneath and fed by our apparatus. This disk is shown as comprising a series of openings or sockets adjacent to periphery for the adjustable reception of a tripping lug 66. This tripping lug 66 automatically trips a valve 67 which sets the press in operation. Thus the starting of the press may be timed with the various operations of our apparatus.

The remaining disks 68 are arranged in pairs, the second from the left of each pair being loosely mounted upon the shaft 65 while the other is rigidly mounted thereon. Each disk carries an inwardly extending pin 62 and the two pins of each pair are mounted to successively actuate one valve through the medium of its star wheel. The period between these actuations is determined by the time in which one pin of a pair follows after the other to actuate the star wheel. It is for this reason that one disk of each pair is loosely mounted, as it is adjustable in relation to the rigidly mounted disks by the intermeshing of gears mounted upon each disk and a beveled pinion 69. This adjustment is effected by the raising or lowering of the arm 70 by means of the screw rod 71 having a handle 72. An examination of Figure 15 will make it apparent that the disks and their pins which operate the valve 101 and 102 are adjustable under the control of a single operating screw 71. The first pair of these disks controls the inlet of operating air to the injector and horizontal cylinder simultaneously. The second pair of these disks controls the rapid up and down movement of the piston in the vertical cylinder 8. It is extremely desirable that all of these elements have their adjustments effected with relation to each other and the mechanism described insures that this will be done. The raising of the member 70 results in lessening the weight of the glass in the severed batch or lump, while the lowering of this member results in increasing this weight. The last pair of disks in Figure 15 are designed to operate the valve 103 so as to govern and produce a slow receding action of the combustion cup after it has once assumed operative position. The period of time of this receding action can be regulated by screw rod 77 in a manner similar to the regulation by the screw rod 71.

It has been made apparent that valve 100 automatically controls the introduction and the exhaust of operating air to and from the knife cylinder. It has further been made apparent that valve 101 automatically controls the introduction of operating air to and its exhaust from the valve of the injector and the horizontal cylinder which moves the combustion cup horizontally. It has been explained that the increase of feed of the combustible mixture to the combustion cup and the initiation of the horizontal movement takes place simultaneously.

Valves 102 and 103 are designed to co-operate, under certain conditions, in the control of the vertical movement of the combustion cup. This cup is designed to be automatically raised by the constant pressure air when it has been moved into proper position beneath the spout aperture. It is also moved horizontally to this proper position by the constant pressure air. When it is desired to move the combustion cup vertically downward with considerable rapidity, the timing mechanism is so set that the valve 102 will be automatically operated to introduce operating air to the vertical cylinder controlling this combustion cup. After this has happened, the timing mechanism will operate the valve 101 to introduce operating air to the horizontal cylinder and thus move the combustion cup horizontally to stationary inoperative position.

It may be desired to lower the cup slowly to retard the extrusion of the glass. If this is done, the final movement of the cup must be rapid so as to clear the glass before the horizontal movement of the cup takes place. We accomplish this by providing for a cooperative relation between the valves 102 and 103. A branch pipe 73 leads from the valve 103 to the pipe 52. The introduction of air to the valve 103 may be throttled by a needle valve 74. Then the automatic actuation of the valve 103 will serve to admit operating air to the branch 73 and then by way of the pipe 52 to the vertical cylinder 8 owing to the effect of the valve 74. However, this air will only be sufficient to force the piston of this cylinder 8 downward at a slow speed. At a given point, however, the valve 102 automatically opens to deliver a full charge of air through the pipe 52 to the vertical cylinder 8. There results a rapid lowering of the combustion cup and this is followed, as usual, by operation of the horizontal cylinder to move the cup horizontally to stationary inoperative position. This rapid drop of the combustion cup after its slow recession before the extruding glass is necessary to insure a clearance of the glass before horizontal movement takes place. The knives may be rendered inoperative by operation of the three-way valve 75 and the combustion cup may be rendered inoperative by operation of the three-way valve 76. (See Figure 1.)

The driven shaft 65 is preferably propelled in the direction indicated by the arrow in Figure 20 by a motor operating through a worm and worm gear as shown in Figures 14 and 15. The knife blades may be cooled by air blasts as at 78.

In operation, the molten glass flows from the tank into the spout to the feed aperture thereof. By the weight of the glass in the spout, a portion of this glass is extruded through the feed aperture and for a predetermined period of time. Then the knives are automatically brought together, serving to sever a portion of the extruded glass and direct its deposit into the treating receptacle in such a manner that it will alight properly. Then, the combustion cup starts to move and simultaneously the pressure of the combustible mixture therein is greatly increased, showing a much increased flame. This combustion cup moves horizontally in an arc until it assumes position beneath the feed aperture, the horizontal movement being effected by the horizontal piston and cylinder described. When it is beneath the feed aperture, it automatically moves upwardly until, in normal usage, it nearly abuts the bottom of the spout, embracing the glass in and depending from the feed aperture. The glass in this aperture may be counterbalanced, given a reverse movement, or it may be permitted to have a retarded descent. After a predetermined proper interval, the cup is automatically dropped and swung horizontally out of position. Then after a further predetermined interval, the knives are brought together to sever a portion of the glass that has extruded. This completes the cycle of operation. Attention has already been called to the fact that the timing mechanism for the movements of the knives and the combustion cup also times the starting of the press.

It is important to note that our apparatus provides for interchangeable bushings so that various sizes of bushings may be provided for different ranges in weight, shape and size of the articles being made. At the same time our apparatus is such that adjust-

Having thus described our invention, what we claim is:

1. Timing mechanism for glass-feeding apparatus comprising valve mechanism for controlling the introduction and exhaust of fluid to the driving units of the glass-feeding apparatus, a pair of cam plates, one cam plate being rigidly mounted on its shaft and the other cam plate being loosely mounted thereon, a pinion intermeshing with gears on said cam plates, whereby the driving of one cam plate causes driving of the other, and means for moving said pinion to adjust the position of the cams on said plates with relation to each other.

2. Timing mechanism for glass-feeding apparatus comprising valve mechanism for controlling the introduction and exhaust of fluid to the operating units of the glass feeding mechanism, a plurality of cam plates provided with apertures determinately spaced around the edges thereof and cam elements designed to removably fit in any one of said apertures.

3. In pneumatic timing mechanism for glass feeding apparatus, a plurality of valves, a rotary cam for actuating each valve, common driving means for rotating the cams to actuate the valves, intermediate gearing between the said driving means and one of said cams, and manually operable means for adjusting said gearing to change the angular position of one cam relative to another and thereby to change the relative time of actuation of the corresponding valves.

4. In pneumatic timing mechanism for glass feeding apparatus, a plurality of valves, a rotary cam for actuating each valve, common driving means for rotating the cams to actuate the valves, intermediate gearing between the said driving means and one of said cams, and means operable manually while said cams are rotating for adjusting said gearing to change the angular position of one cam relative to another and thereby to change the relative time of actuation of the corresponding valves.

5. In pneumatic timing mechanism for glass feeding apparatus, a plurality of valves, a rotary cam for actuating each valve, a rotary driving member extending axially through said cams and arranged to rotate the cams to actuate the valves, intermediate gearing between the said driving means and one of said cams, and means, operable manually while said cams are rotating, for adjusting said gearing to change the angular position of one cam relative to another and thereby to change the relative time of actuation of the corresponding valves.

6. In timing mechanism for glass-feeding apparatus having a plurality of movable units, a plurality of valves for controlling the movements of the units, a rotatable shaft carrying a plurality of cams, said cams being arranged in pairs, each pair being adapted to positively open and close one of said valves, the cams of each pair being relatively adjustable about their axis of rotation to vary the period between the opening and closing of said valves.

7. In timing mechanism for glass-feeding apparatus having a plurality of movable units, a plurality of valves for controlling the movement of the units, a rotatable shaft carrying a plurality of cams, said cams being arranged in pairs, each pair being adapted to positively open and close one of said valves, and means for relatively adjusting one of the cams in each pair about its axis of rotation while said cams are rotating to vary the period between opening and closing of said valves.

8. In timing mechanism for glass-feeding apparatus, a valve, a rotatable shaft, a cam rotated by the shaft for positively opening the valve, another cam rotated by the same shaft for positively closing said valve, one of said cams being shiftable about its axis of rotation to vary the period between the opening and closing of the valve.

9. In timing mechanism for glass-feeding apparatus, a valve, a rotatable shaft, a cam rotated by the shaft for positively opening the valve, another cam rotated by the same shaft for positively closing said valve, and means, operable manually while said cams are rotating, for adjusting one of said cams rotatively around its axis of rotation to vary the period between the opening and closing of the valve.

10. In timing mechanism for glass-feeding apparatus, a valve, a rotatable shaft, a cam rotated by said shaft for positively moving said valve to apply fluid, another cam rotated by the same shaft for positively moving said valve to exhaust said fluid, the relative angular position of said cams being adjustable to maintain the period between successive movements of said valve upon a change in speed of rotation of said shaft.

11. In timing mechanism for glass-feeding apparatus, a valve, a rotatable shaft, a cam rotated by said shaft for positively moving said valve to apply fluid, another cam rotated by the same shaft for positively moving said valve to exhaust said fluid, the relative angular position of said cams being adjustable to change the period between successive movements of said valve with constant speed of rotation of said shaft.

12. In a timing device for a glass feeder, the combination with a source of constant fluid pressure and a valve for transmitting said fluid pressure to said feeder, of a rotary actuating member for opening said valve, another rotary actuating member for closing said valve, and means, operable while said actuating members are rotating, for changing the angular position of one of said actuating members with respect to the other.

13. In a timing device for a glass feeder, the combination with a source of constant fluid pressure and a valve for transmitting said fluid pressure to said feeder, of a rotary actuating member for opening said valve, another rotary actuating member for closing said valve, and means, operable while said actuating members are rotating, for changing the angular position of the valve-opening member independently of the valve closing member.

14. In a timing device for a glass feeder, the combination with a source of constant fluid pressure and a valve for transmitting said fluid pressure to said feeder, of a rotary actuating member for positively opening said valve, another rotary actuating member for positively closing said valve, a shaft carrying said actuating members, and gearing, manually operable while the said actuating members are rotating, for changing the angular relation of one of said actuating members with respect to another.

15. Timing mechanism for glass-feeding apparatus comprising a valve mechanism for controlling the application and exhaust of fluid to the driving units of the glass-feeding apparatus, a rotatable shaft, a pair of cam plates rotated by said shaft, said cam plates being so interlocked as to move simultaneously and positively open and close the valve, cam elements carried by said cam plates for contacting with said valve mechanism to apply and exhaust said fluid, and means for adjusting the position of said cam elements relative to each other to vary the period between application and exhaust.

16. Timing mechanism for glass-feeding apparatus comprising a valve mechanism for controlling the application and exhaust of fluid to the driving units of the glass-feeding apparatus, a rotatable shaft, a pair of cam plates rotated by said shaft, said cam plates being so interlocked as to move simultaneously and positively open and close the valve, cam elements carried by said cam plates for contacting with said valve mechanism to apply and exhaust said fluid and means for adjusting the position of said cam plates relative to each other to vary the position of said cam elements relative to each other to vary the period between application and exhaust.

17. Timing mechanism for glass-feeding apparatus comprising a valve mechanism for controlling the application and exhaust of fluid to the driving units of the glass-feeding apparatus, a rotatable shaft, a pair of cam plates rotated by said shaft, said cam plates being so interlocked as to move simultaneously and positively open and close the valve, cam elements carried by said cam plates for contacting with said valve mechanism to apply and exhaust said fluid and means for adjusting the position of said cam elements relative to each other while the glass-feeding apparatus is in operation to vary the period between application and exhaust.

18. Timing mechanism for glass-feeding apparatus comprising a plurality of valves for controlling the application and exhaust of fluid to a plurality of movable elements of the glass-feeding apparatus, each of said valves having an exposed contacting surface, a rotatable shaft carrying a plurality of cooperative cams geared thereto, each cam having a portion which contacts with the exposed surface of its respective valve at some point during each cam revolution, and means for varying the position of said cam-contacting portions relative to each other to vary the time of contact with the exposed surface of said valves to vary the time between application and exhaust.

19. Timing mechanism for glass-feeding apparatus comprising a plurality of valves for controlling the application and exhaust of fluid to a plurality of movable elements of the glass-feeding apparatus, each of said valves having an exposed contacting surface, a rotatable shaft carrying a plurality of cooperative cams geared thereto, each cam having a portion which contacts with the exposed surface of its respective valve at some point during each cam revolution, and means for varying the time of contact of one cam relative to the time of contact of its cooperating cam to vary the period between application and exhaust.

20. Timing mechanism for glass-feeding apparatus comprising a valve for controlling the application and exhaust of fluid to a glass-feeding unit and having a plurality of operating arms operatively connected therewith, a rotatable shaft, a pair of discs rotated by said shaft, a valve contacting member on each of said discs, the member on one disc contacting with one of said valve arms to open said valve and the member on the other disc contacting with another of said valve arms to close said valve, and means for rotating one of said discs concentrically with said shaft to vary the position of said members relative to each other to vary the period between opening and closing of said valve.

21. Timing mechanism for glass-feeding apparatus comprising a valve for controlling the application and exhaust of fluid to a glass-feeding unit and having a plurality of operating arms operatively connected therewith, a rotatable shaft, a pair of discs rotated by said shaft, a valve contacting member on each of said discs, the member on one disc contacting with one of said valve arms to move said valve to apply said fluid and the member on the other disc contacting with another of said valve arms to move said valve to exhaust said fluid, and means for varying the position of said discs relative to each other to vary the position of said members to vary the period between application and exhaust.

22. Timing mechanism for glass-feeding apparatus comprising a valve for controlling the application and exhaust of fluid to a glass-feeding unit and having a plurality of operating arms operatively connected therewith, a rotatable shaft, a pair of discs rotated by said shaft, a valve contacting member on each of said discs, the member on one disc contacting with one of said valve arms to move said valve to apply said fluid and the member on the other disc contacting with another of said valve arms to move said valve to exhaust said fluid, and means for varying the position of said discs during operation relative to each other to vary the position of said members to vary the period between application and exhaust.

23. Timing mechanism for glass-feeding apparatus comprising a valve for controlling the application and exhaust of fluid to a glass-feeding unit and having a plurality of operating arms operatively connected therewith, a rotatable shaft, a pair of discs rotated by said shaft, a valve contacting member on each of said discs, the member on one disc contacting with one of said valve arms to move said valve to one position and the member on the other disc contacting with another of said valve arms to move said valve to another position, and means for rotating one of said discs concentrically with said shaft during operation to vary the position of said members relative to each other to vary the period between opening and closing of said valve.

24. In timer structure for glass-feeding apparatus having a plurality of fluid-pressure cylinders for imparting various movements thereto, a plurality of valves for controlling the application of fluid to and its exhaust from said cylinders, a single rotatable member carrying a plurality of cams for opening and closing said valves to apply and exhaust said fluid, and means for moving said cams concentrically relative to said rotatable member to vary the period between application and exhaust.

25. In timer structure for glass-feeding apparatus having a plurality of fluid-pressure cylinders for imparting various movements thereto, a plurality of valves for controlling the application of fluid to and its exhaust from said cylinders, a single rotatable member carrying a plurality of cams for opening and closing said valves to apply and exhaust said fluid, and means for moving said cams concentrically relative to said rotatable member during operation to vary the period between application and exhaust.

26. In timer structure for glass-feeding apparatus having a plurality of fluid-pressure cylinders for imparting various movements thereto, a plurality of valves for controlling the application of fluid to and its exhaust from said cylinders, an actuator for each valve, a single rotatable member carrying a plurality of cams, said cams being arranged to cooperate in pairs, one cam moving the actuator to open the valve to apply said fluid and the other cam operating the actuator to close said valve to exhaust said fluid, and means for moving one of said cams relative to the other to vary the period between application and exhaust.

27. In timer structure for glass-feeding apparatus having a plurality of fluid-pressure cylinders for imparting various movements, thereto, a plurality of valves for controlling the application of fluid to and its exhaust from said cylinders, a single rotatable member carrying a plurality of cams, said cams being arranged to cooperate in pairs, one cam positively moving its valve to apply said fluid and the other cam positively operating said valve to exhaust said fluid, and means for moving one of said cams relative to the other while said cams are rotating to vary the period between application and exhaust.

28. In timer structure for glass-feeding apparatus having a plurality of fluid-pressure cylinders for imparting various movements thereto, a plurality of valves for controlling the application and exhaust of fluid to said cylinders, an actuator for each valve, a rotatable shaft carrying a plurality of cams, said cams being separately mounted and arranged in pairs to operate an actuator to positively open and close each of said valves to apply and exhaust said fluid, said cams being adjustable concentrically of said shaft relative to each other to vary the period between application and exhaust.

In testimony whereof we hereby affix our signatures.

OLIVER M. TUCKER.
WILLIAM A. REEVES.